United States Patent [19]
Martinez et al.

[11] Patent Number: 6,011,814
[45] Date of Patent: Jan. 4, 2000

[54] ADAPTIVE COMB FILTER AND DECISION FEEDBACK EQUALIZER FOR NOISE SUPPRESSION

[75] Inventors: Rafael S. Martinez, Clearwater; William L. Betts, St. Petersburg, both of Fla.

[73] Assignee: Paradyne Corporation, Largo, Fla.

[21] Appl. No.: 08/992,498

[22] Filed: Dec. 17, 1997

Related U.S. Application Data

[60] Provisional application No. 60/060,478, Sep. 30, 1997.
[51] Int. Cl.[7] .............................. H03K 5/159; H04N 5/21; G06F 17/10
[52] U.S. Cl. ...................... 375/233; 348/607; 364/724.2
[58] Field of Search ................................... 375/233, 232, 375/346, 316; 348/607; 364/724.2; 333/18, 28 R

[56] References Cited

U.S. PATENT DOCUMENTS

| 5,452,015 | 9/1995 | Hulyalkar | 375/346 |
| 5,572,262 | 11/1996 | Ghosh | 348/607 |
| 5,648,822 | 7/1997 | Hulyalkar | 348/607 |

*Primary Examiner*—Stephen Chin
*Assistant Examiner*—Albert Park
*Attorney, Agent, or Firm*—Thomas, Kayden Horstemeyer & Risley

[57] ABSTRACT

An improvement to a half duplex multipoint communication environment wherein a digital subscriber line (DSL) receiver employs an adaptive comb filter and a decision feedback equalizer (DFE) to efficiently suppress or eliminate low frequency periodic impulse noise and crosstalk generated in the vicinity of the device receiver.

50 Claims, 5 Drawing Sheets

ADAPTIVE COMB FILTER AND DECISION FEEDBACK EQUALIZER FOR NOISE SUPPRESSION

CROSS REFERENCE TO RELATED APPLICATION

This document claims priority to and the benefit of the filing date of copending and commonly assigned U.S. Provisional Patent Application entitled ADAPTIVE COMB AND DFE FOR NOISE SUPPRESSION, assigned ser. No. 60/060,478, and filed Sept. 30, 1997 and is hereby incorporated by reference.

FIELD OF THE INVENTION

The present invention relates generally to data communications, and more particularly, to an apparatus and method for suppressing low frequency periodic impulse noise generated near a receiver in a multipoint communications environment.

BACKGROUND OF THE INVENTION

In the field of data communications, a modem is used to convey information from one location to another. Digital Subscriber Line (DSL) technology now enables modems or other devices to communicate rapidly large amounts of data. Devices communicate by modulating a baseband signal carrying digital data, converting the modulated digital data signal to an analog signal, and transmitting the analog signal over a conventional copper wire pair using techniques that are known in the art. These known techniques include mapping the information to be transmitted into a signal space constellation, differentially encoding the information to reduce errors and improve throughput, and transmitting the information over a communication channel. The constellation can include both analog and digital information or often merely digital information.

At a receiver, the signal is received, equalized and decoded in accordance with techniques that those skilled in the art will appreciate.

In the above mentioned communications system, a control device, i.e., one that is located at a telephone company central office, connects on the communication channel to a plurality of remote devices typically located at a customer residential or business location. This topography is known as a multipoint communication environment because one control device is communicating with a plurality of remote devices co-located at a remote location, over a single communication channel. The communication technique between the control device and the remote device is generally half duplex in nature, meaning that only one device may transmit at any particular time. In order to establish a communications connection between the central office device and any of the remote devices, a preamble, which allows the devices to synchronize at the start of each message is required. Existing techniques such as carrierless amplitude/phase modulation (CAP) and discrete multitone (DMT) modulation allow modems to transmit simultaneously between only two devices at a time. In a multipoint environment, greater circuit efficiency is possible because of the ability to connect multiple devices to the same communication channel. In the above mentioned communication environment, noise is an everpresent obstacle to optimal receiver performance. Noise imparted by the communication channel can be substantially eliminated through the use of well known techniques such as precoding and channel equalization. Local noise imparted to a receiver, such as periodic impulse noise from local low frequency sources like light dimmers, and crosstalk from other signal sources presents a greater problem that can degrade receiver performance. All DSL equipment is susceptible to these impairments. In order to combat crosstalk, carrierless amplitude/phase (CAP) modulation uses a precoder while discrete multi-tone (DMT) selectively disables the affected frequency bins. The 60 Hz periodic impluse noise (such as that generated by a local electrical appliance such as a light dimmer) is allowed to exist and the resulting errors are corrected by a Reed Solomon (RS) code, which can delay the data. For multi-point applications however, the RS and DMT codes are ineffective. For example, the precoder used with CAP is located in the transmitter, and will cause discontinuities when the transmitter is switched on and off, as frequently occurs in a multipoint environment. Furthermore, the control device in the multipoint environment can have but one set of precoder coefficients for broadcasting to all remote devices, which may have different precoder needs. Also, ringing caused by on/off polling cannot be canceled by a precoder because the transmitter and precoder are inoperable during the ringing transient.

Therefore, it would be desirable to provide a noise suppression system at a communication device receiver to reduce or eliminate the local low frequency periodic impulse noise imparted to the receiver, while operating in a multipoint environment.

SUMMARY OF THE INVENTION

The present invention provides an improvement to a half duplex multipoint communication environment by enabling a device receiver to efficiently suppress low frequency periodic impulse noise generated by local sources. This low frequency noise can be for example, the 60 Hz noise generated by a light dimmer or other electrical appliance located near the device receiver, or the noise can be crosstalk generated in the vicinity of the device receiver. By employing an adaptive comb filter and decision feedback equalizer in accordance with the present invention, the device receiver can suppress or eliminate this local low frequency noise, thus improving the performance of the receiver of the communication device.

The present invention provides an apparatus for noise suppression, the apparatus comprising a comb filter and a decision feedback equalizer (DFE). The DFE is configured to operate on those low frequency impulse signals having a period that is proportionally related to the number of tap coefficients of the DFE. The number of tap coefficients in the DFE is related to the frequency of noise that can be suppressed in that the more the taps, the longer the period (i.e., the lower the frequency) of noise that can be canceled. Also incorporated is an adaptive comb filter, which, if certain conditions are satisfied, further enhance the noise suppression of the DFE using merely one (1) adaptive coefficient. A single coefficient is sufficient so long as the period of the noise sought to be suppressed is exactly an integer number of symbol periods. A ring buffer located within the adaptive comb filter stores one period of the low frequency noise, enabling a single adaptive coefficient to suppress the noise. The adaptive comb filter also includes a gating apparatus configured to enable the comb filter output only when the energy in the adaptive comb filter exceeds a predefined threshold.

The present invention also includes a method for suppressing periodic impulse noise in the receiver of a digital subscriber line (DSL) communication device. First a signal is received by a receiver located in a DSL communication device. The signal is operated on by an equalizer as is known in the art, and optionally by a nonlinear decoder as is known in the art. The output of the equalizer, or nonlinear decoder if used, has the output of a decision feedback equalizer (DFE) added thereto. The DFE can suppress or eliminate low frequency periodic impulse noise having a period that is proportionally related to the number of tap coefficients of the DFE. If certain conditions are satisfied, the output of an adaptive comb filter is added to the combined output of the equalizer and DFE. The method also includes the step of storing in a ring buffer or bulk memory device, which is located within the adaptive comb filter, at least one of the periods of the noise signal. This enables an adaptive comb filter having a single coefficient the ability to efficiently suppress this low frequency noise. Furthermore, the method of the adaptive comb filter and DFE includes the step of gating the adaptive comb filter in order to enable the output of the adaptive comb filter only when the energy in the adaptive comb filter exceeds a predetermined threshold.

In an alternative embodiment, the present invention includes an apparatus and method wherein the adaptive comb filter is provided with additional coefficients, thus enabling the filter to track a frequency error between the noise and the symbol rate of the communication device.

The invention has numerous advantages, a few of which are delineated hereafter, as merely examples.

An advantage of the adaptive comb filter and decision feedback equalizer is that it substantially reduces or eliminates any low frequency periodic impulse noise generated in the vicinity of a DSL receiver.

Another advantage of the adaptive comb filter and decision feedback equalizer is that it utilizes an adaptive comb filter having few or a single coefficient, thus reducing the amount of system resource required to perform the adaptive calculations.

Another advantage of the adaptive comb filter and decision feedback equalizer is the use of a gated comb filter which activates only when impulses are present so as to reduce noise enhancement.

Another advantage of the adaptive comb filter and decision feedback equalizer is that it recovers gracefully from lengthy interruptions in the signal path and thus, can be used in a multipoint communication environment where the received signal is periodically interrupted.

Another advantage of the adaptive comb filter and decision feedback equalizer is that it can be used to track frequency offset by adjusting the comb size.

Another advantage of the adaptive comb filter and decision feedback equalizer is that it allows a control device to have multiple sets of adaptive decision feedback equalizer coefficients thus enabling a single control device to maintain equalization with a plurality of remote devices.

Another advantage of the adaptive comb filter and decision feedback equalizer is it's ability to squelch the ringing that occurs on the communication channel when other transmitters in the multipoint environment pulse on and off.

Another advantage of the adaptive comb filter and decision feedback equalizer is that it is simple in design, reliable in operation, and its design lends itself to economical mass production in communication devices.

Other features and advantages of the present invention will become apparent to one with skill in the art upon examination of the following drawings and detailed description. It is intended that all such additional features and advantages be included herein within the scope of the present invention, as defined in the appended claims.

BRIEF DESCRIPTION OF THE DRAWINGS

The present invention, as defined in the claims, can be better understood with reference to the following drawings. The components within the drawings are not necessarily to scale relative to each another, emphasis instead being placed on clearly illustrating the principles of the present invention.

DETAILED DESCRIPTION OF THE PREFERRED EMBODIMENT

The present invention can be implemented in software, hardware, or a combination thereof. In the preferred embodiment, the elements of the present invention are implemented in software that is stored in a memory and that configures and drives a suitable digital signal processor (DSP) situated in a communication device. However, the foregoing software can be stored on any computer-readable medium for transport or for use by or in connection with any suitable computer-related system or method. In the context of this document, a computer-readable medium is an electronic, magnetic, optical, or other physical device or means that can contain or store a computer program for use by or in connection with a computer-related system or method. Furthermore, the present invention is applicable to all modulation schemes as known in the art.

Figure 1:
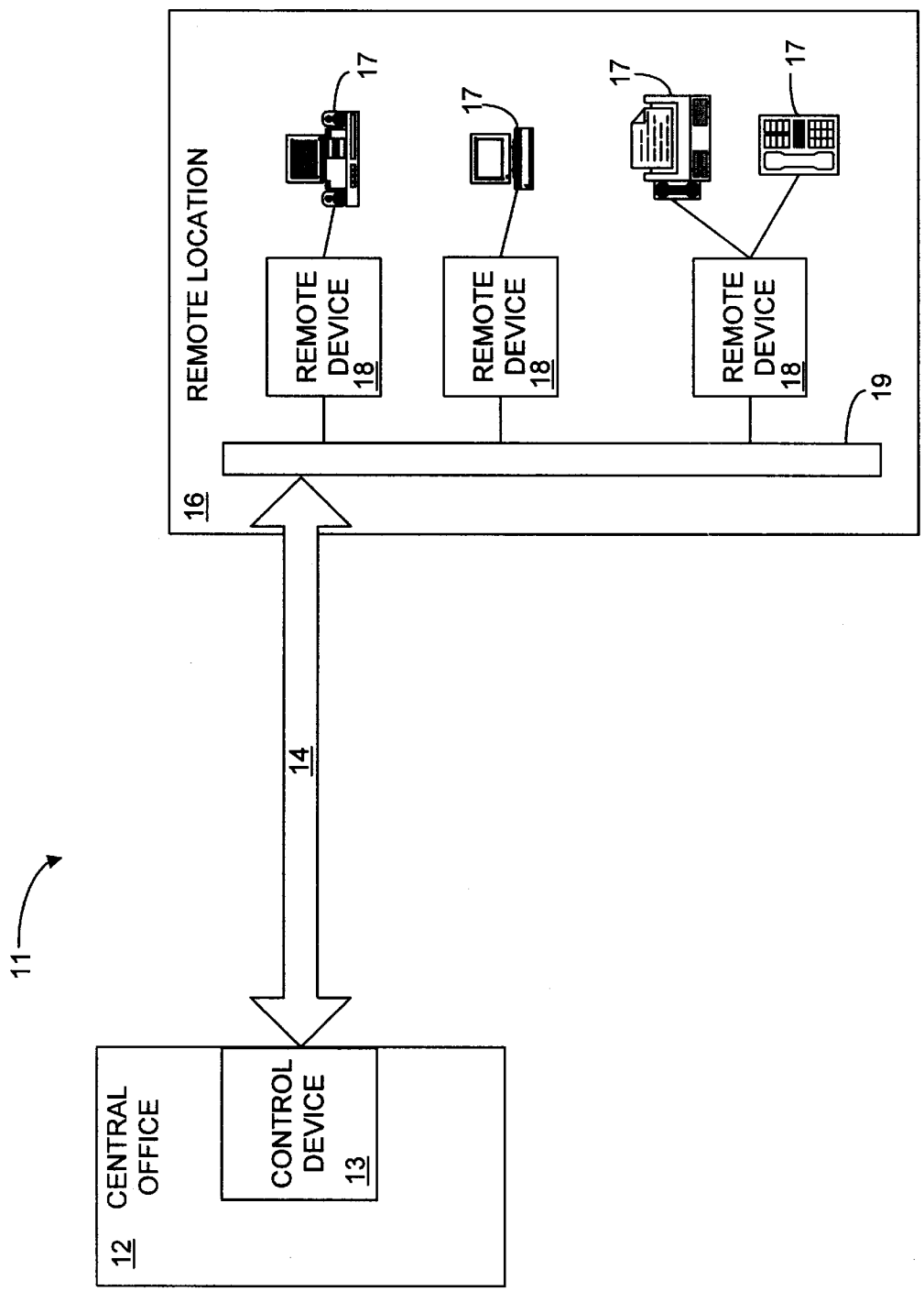
FIG. 1 is a schematic view illustrating a multipoint communications environment.

FIG. 1, shows a schematic view illustrating a multipoint communications environment 11 in which devices employing the noise suppression apparatus and method of the present invention are used. Remote location 16 is connected to central office location 12 via communication channel 14. In the preferred embodiment, control device 13 and remote device 18 are illustratively digital subscriber line (DSL) communication devices. However, the concepts of the present invention are applicable to various other types of communication devices employing adaptive equalization. Located at central office location 12 is control device 13. Communication channel 14 is typically the copper wire pair that extends between a telephone company central office and a remote residential, business, or any other location served by local telephone service. Remote location 16 may contain a plurality of remote devices 18 connecting a plurality of user devices 17 to communication channel 14 via communication bus 19. Communication bus 19 is illustratively the copper wiring infrastructure used throughout a remote location to connect remote devices 18 to communication channel 14. Remote devices 18 are typically located in a residential or business location. These locations often contain low frequency noise generating electrical appliances, such as light dimmers and other electrical devices. These appliances typically generate low frequency periodic impulse noise in the frequency range of 60–120 Hz. Furthermore, other signal generating sources may be located in the vicinity of remote device 18, these sources generate crosstalk, which can further degrade the performance of the receiver of remote device 18. By using control device 13 and remote devices 18 employing the concepts and features of the present invention, it is possible for the receiver located in remote device 18 and control device 13 to efficiently suppress or cancel this low frequency periodic impulse noise and crosstalk generated in it's vicinity. For simplicity, the present invention will be described as residing in the receiver of remote device 18, however, the noise suppression apparatus and method can be applied to any communication receiver, including the receiver located in control device 13.

Figure 2:
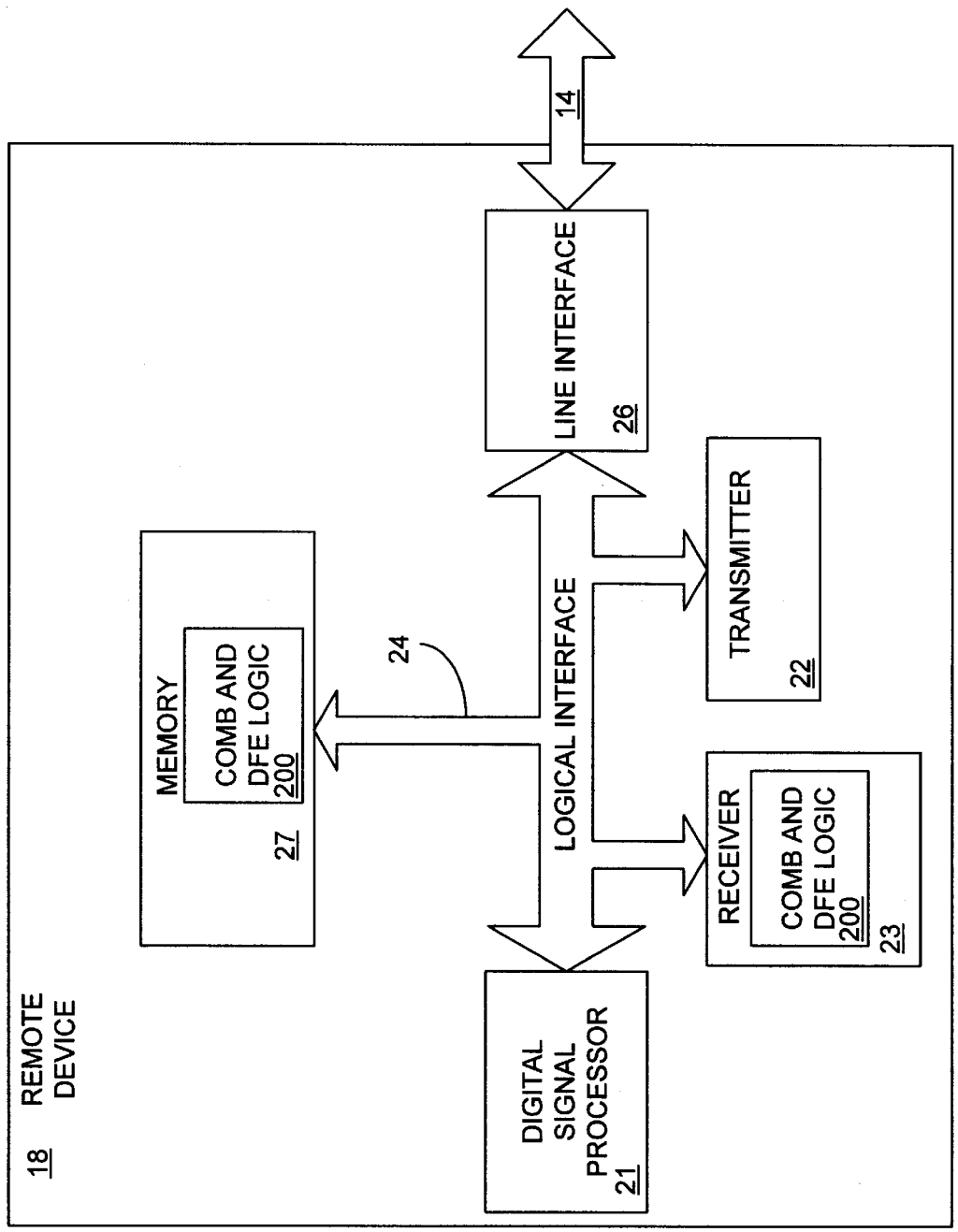
FIG. 2 is a block diagram of a communications device including the adaptive comb filter and decision feedback equalizer low frequency noise suppression logic of the present invention.

Now referring to FIG. 2, shown is a schematic view illustrating remote device 18 of FIG. 1 including the adaptive comb filter and decision feedback equalizer noise suppression logic of the present invention. Typically, control device 13 will transmit signals to remote devices 18 over communications channel 14. Similarly remote devices 18 will transmit signals to control device 13.

Remote devices 18 contain noise suppression logic 200 which enable the remote devices to efficiently suppress or eliminate low frequency periodic impulse noise. Still referring to FIG. 2, remote device 18 contains conventional components as is known in the art of data communications. Digital Signal Processor (DSP) 21 controls the operation of the devices' transmitter 22 and receiver 23 through logical interface 24, and couples to line interface 26 to gain access to communications channel 14. Also included in receiver 23 of remote device 18 is comb filter and DFE logic 200 which enables remote device 18 to reliably and economically suppress or eliminate low frequency periodic impulse noise generated in the vicinity of receiver 23. Also contained within remote device 18 is memory 27, which also includes comb filter and DFE logic 200. In a preferred embodiment, the logic of the present invention is executed within DSP 21 and is therefore shown as residing in both receiver 23 and memory 27.

Figure 3:
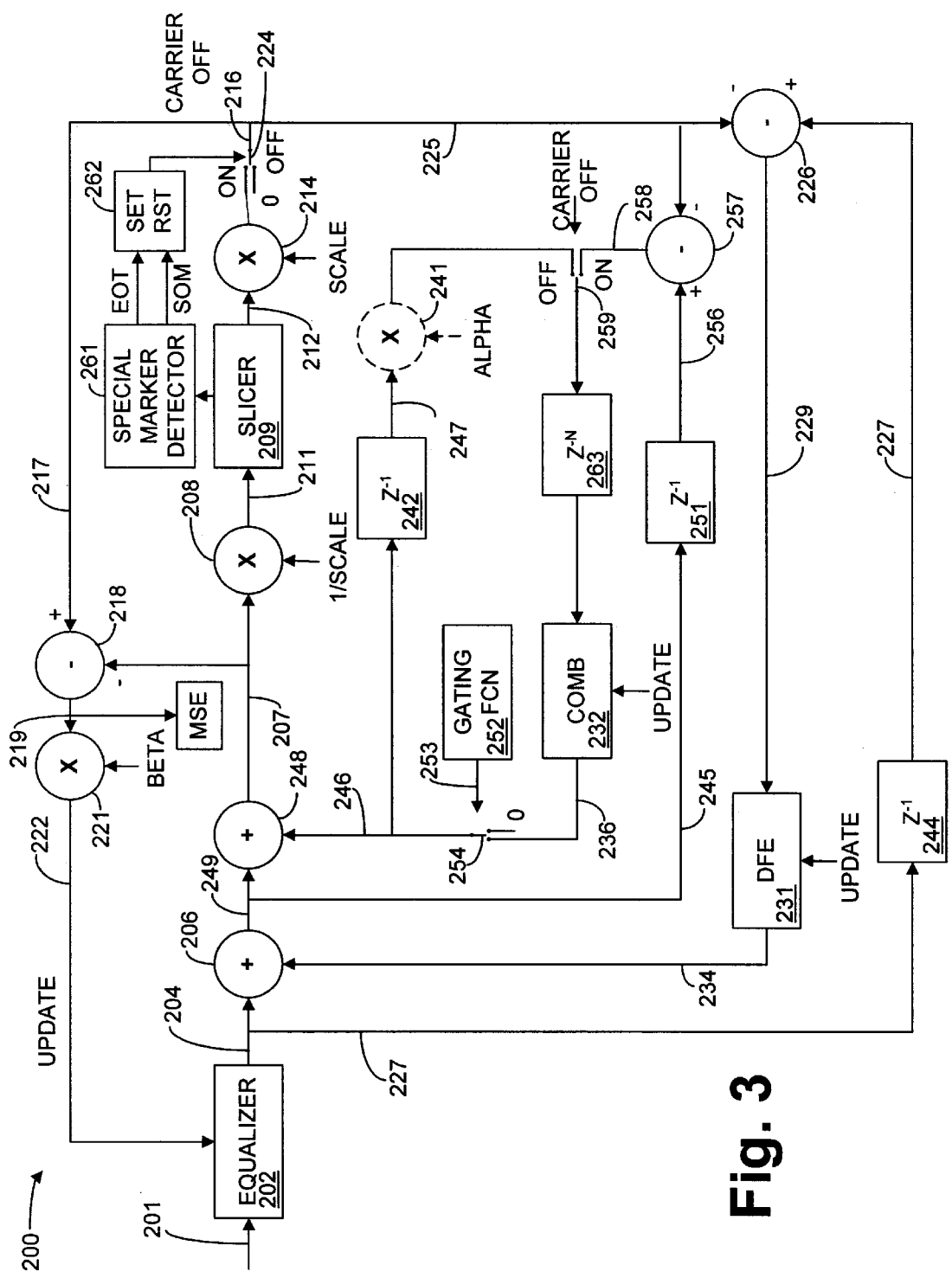
FIG. 3 is a block diagram illustrating the adaptive comb filter and decision feedback equalizer of the present invention.

With reference now to FIG. 3, illustrated is a block diagram showing the adaptive comb filter, decision feedback equalizer (DFE), and related circuitry of the present invention as applied to remote device 18 as illustrated in FIG. 2.

Decision feedback equalizer (DFE) 231 adds a compensation signal on line 234 to adder 206. Adder 206 adds the compensation signal from DFE 231 with the output of conventional equalizer 202 on line 204. The output of adder 206 (the combined output of DFE 231 and equalizer 202) is supplied to memory device 251 on line 245.

Optionally, a nonlinear encoder can be placed at the output of equalizer 202 (i.e., on line 204) as is known in the art.

Adder 248 receives the output of adaptive comb filter 232 on line 246 and adds it to the combined equalizer and DFE output on line 249 if certain conditions are satisfied. Specifically, adaptive comb filter provides gating function 252. Gating is accomplished by computing the total energy in filter 232, and if that energy exceeds some threshold (indicating that low frequency impulse noise is present), then the output of adaptive comb filter 232 is computed and added to the output of the combined equalizer 202 and DFE 231. If the energy is below the threshold then the output of adaptive comb filter 232 is set to zero by gating function 252 on line 253 through logical switch 254. This significantly reduces noise enhancement that may otherwise be caused by adaptive comb filter 232. Optimally, a threshold value of two to four times the mean squared error on line 219 at the input to Beta multiplier 221 has been found appropriate.

The input to adaptive comb 232 is computed using the combined output of equalizer 202 and DFE 231 on line 245. This will prevent adaptive comb filter 232 from regenerating impulses that may have been removed by DFE 231. DFE 231 also serves to whiten the impulses that may have been distorted by equalizer 202. Equalizer 202 is inverting the channel between the remote transmitter and the local receiver. The noise impulses have been detected near the local receiver and did not pass through the entire channel. Thus, equalizer 202 will shape the impulses and may reduce the effectiveness of adaptive comb filter 232. Using the combined output of DFE 231 and equalizer 202 as input to adaptive comb filter 232 improves the effectiveness of comb filter 232. The combined output of DFE 231 and equalizer 202 is supplied to memory delay element 251 on line 245 and the output of memory delay element 251 is supplied on line 256 to adder 257. The output of slicer 209 on line 225, the operation of which will be discussed henceforth, is subtracted from the output of memory delay element 251 by adder 257, and supplied to carrier off switch 259 on line 258. When carrier off switch 259 is positioned for normal operation, output of adder 257 on line 258 is supplied to bulk memory device 263. Bulk memory device, or ring buffer, 263 delays approximately one period of the periodic impulses. The output of bulk memory device 263 supplies the input to adaptive comb filter 232, which will shape the regenerated impulse and track frequency offset variations. Adaptive comb filter 232 can be a complex finite impulse response (FIR) filter. For a FIR filter with M taps, impulses having a period between $N/f_s$ and $(N+M)/f_s$ can be tracked and canceled, with $f_s$ being the symbol rate of the receiver. N is the number of symbol delays in bulk memory device 263 (i.e., a ring buffer) and approximates the one period of the periodic impulse sought to be canceled.

The operation of carrier off switches is as follows. When the transmit carrier is off, these switches, 259 and 224 provide a zero ideal reference signal output from slicer 209, and select the output of adaptive comb filter 232 to feed back as the input to adaptive comb filter 232. Detection of carrier state is well known in the art.

When the output of adaptive comb filter 232 is above the threshold value, its output is supplied on line 236 through gating switch 254 (i.e., the switch controlled by gating function 252) to adder 248 on line 246. The output of adder 248 on line 207 is the fully compensated signal for input to slicer 209.

The fully compensated signal on line 207, is scaled down by 1/scale factor 208. This scaling is done to enable the signal to fit a uniform grid suitable for slicing. The grid is typically based upon a power of two (2), such that a simple mask operation slices the original signal, as will be appreciated by one skilled in the art. Slicer 209 may optionally include a trellis decoder and Viterbi decoder as known in the art.

Operating on the signal with 1/scale factor 208 enables a single slicing system to be employed for all data rates, thus providing full data rate agility. The output of slicer 209 on line 212 includes an index for subsequent data encoding and an ideal reference signal representing the ideal vector that would have been received in the absence of any signal distortion. The ideal reference signal is then scaled up in scaler 214 to restore it to the same size as the original output of equalizer 202. Scaler 214 provides an operation that is a function of the data rate such that the gain of equalizer 202 will be constant for all data rates. This allows the data rate to be seamlessly changed on a frame by frame basis without disrupting the operation of adaptive comb filter 232 and DFE 231.

Generation of the ideal reference signal by slicer 209 can be a problem in a multipoint environment because of the intermittent nature of multipoint communication. The precursor to each transmission is silence, or zero signal. Similarly, at the end of each transmission silence is again received. Conventional slicer 209 does not generate a zero reference vector because it would cause a significant loss in performance. A slice at zero would have significantly less margin, or signal strength, than a normal data vector and would result in higher error probability at the start and end of each message. To this end, copending commonly assigned U.S. patent application Ser. No. 08/979,455 filed on Nov. 26, 1997, entitled "SYSTEM AND METHOD FOR TRANSMITTING SPECIAL MARKER SYMBOLS" (Attorney Docket No. 61606-1830) incorporated herein by reference, discloses a system and method that can be employed by the adaptive comb filter and DFE of the present invention to reliably define the start and end of each message. The output of slicer 209 is supplied to special marker detector 261. When the "End of Transmission" (EOT) special marker is detected, latch 262 is set to signal "carrier off", and switches 259 and 224 will be positioned to the zero ideal reference case. When the "Start of Message" (SOM) marker is detected, latch 262 will set switches 259 and 224 to the carrier on position enabling normal operation of adaptive comb filter 232 and DFE 231.

Switch 224 located in the ideal reference signal path line 216 is positioned to provide the zero vector prior to receiving the Start of Message (SOM) special marker signal. Special marker detector 261 detects this SOM signal and acts to position switch 224 in order to pass the SOM signal and the subsequent ideal reference signals on line 225. Similarly, when the End of File (EOF) or EOT special marker signal is detected, special marker detector 261 positions switch 224 on the following frame to again generate the zero vector. The resulting ideal reference signals are valid when no signal is received. Without a valid reference signal, DFE 231 of length M would be unable to correct the first M symbols of every received message. M refers to the number of coefficients in DFE 231.

Still referring to FIG. 3, the ideal reference signal on line 225 is subtracted from the previous output of equalizer 202 on line 227 by subtractor 226, after being delayed one period by delay element 244, in order to generate an updated error signal on line 229 for input to DFE 231. The previous symbol is used because the reference signal corresponds to the previous symbol. The input signal on line 229 is the error between the output of equalizer 202 and the ideal reference generated by slicer 209. Only the equalizer error signal is stored in the memory of DFE 231 and adaptive comb filter 232, thus a change in the adaptive coefficients of DFE 231 and adaptive comb filter 232 will not affect the received data signal, but merely the noise signal. This provides the advantage of data rate transparency and continuity during the intermittent multipoint signal.

The adaptive comb filter and decision feedback equalizer are also designed to eliminate any residual error present in the system. The fully compensated signal on line 207 is subtracted from the ideal reference signal on line 217 in subtractor 218. This error signal on line 219 is scaled by beta scaler operator 221, thus producing the residual error signal on line 222 used to update the coefficients of equalizer 202 and the DFE 231 and adaptive comb filter 232 as indicated by the update arrow. To increase their adaptation rate as known by those skilled in the art, the update arrows into DFE 231 and adaptive comb filter 232 may have larger beta scalers than that used for equalizer 202. A beta increase of $2^4$ has been found useful.

Still referring to FIG. 3, also included is a flywheel circuit comprised of elements 242, 241 and switch 259. In 2 wire multipoint applications such as that contemplated in the present invention, the receiver is interrupted by periodic transmissions causing discontinuities in the memories of such devices as equalizers and filters. The transmitter of the instant device may be active, or the transmitter of other remote devices connected to communication channel 14 may be active. During these interruptions, the signal on line 258 used as the input to adaptive comb filter 232 is invalid. During these times, the transmitter may saturate the input making any attempt at signal recovery unlikely to succeed. The flywheel circuit allows the previous sample stored in the memory of adaptive comb filter 232 to be reused. The sample is passed through one sample delay element 242 such that the delay around the flywheel circuit is exactly one period of the interfering signal. Alpha attenuator 241 is optionally provided to incrementally attenuate the signal. Alpha attenuator 241 assures that a signal will not remain stored in the memory of adaptive comb filter 232 indefinitely. Once the signal in filter 232 has attenuated, the next arrival of an interfering signal will remain uncompensated, however subsequent signals will be fully compensated. For example, an alpha attenuator value of 0.9 will reduce regenerated impulses by 10% each period of the impulse eventually eliminating the regenerated response.

Figure 4:
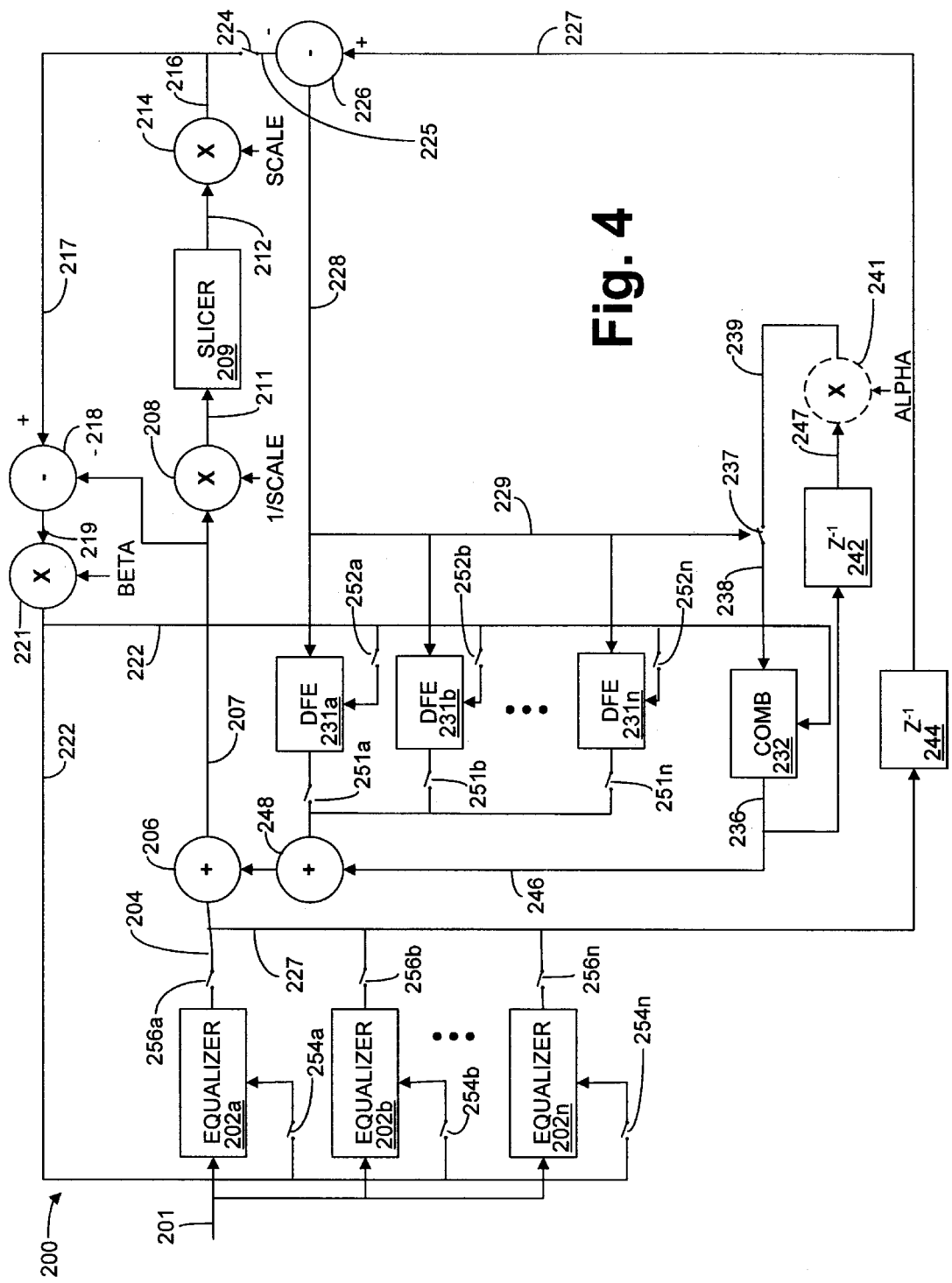
FIG. 4 is a block diagram illustrating the adaptive comb filter and decision feedback equalizer of the present invention used in a control device of FIG. 1 in a multipoint environment.

Referring now to FIG. 4, shown is a block diagram illustrating the adaptive comb filter and decision feedback equalizer used in a control device 13 in a multipoint environment. The like numbered elements of FIG. 4 perform the same functions as those in FIG. 3. FIG. 4 illustrates a control device 13 capable of storing and applying adaptive coefficients for a plurality of remote devices 18. For example, conventional equalizer 202 is depicted in FIG. 4 as a plurality of equalizers 202a through 202n to correspond to a K plurality of remote devices 18, each having an equalizer with a different set of coefficients. Similarly, DFE 231 is depicted as a plurality of DFE's 231a through 231n to correspond to a K plurality of remote devices 18, each having a DFE with a different set of coefficients. These, and other adaptive coefficients are stored in a common data memory (not shown) and can be recalled each time a remote device 18 transmits. Switches 256a through 256n and 251a through 251n select the proper equalizer and DFE (and respective coefficients) for the particular remote device 18 transmitting at the time. This arrangement provides true multipoint adaptive DFE operation insuring optimum performance from each remote device 18. Adaptive comb filter 232 is rejecting an independent, undesirable impulse signal that remains unchanged independent of the remote device 18. The impulse was generated locally near the receiver and is independent of the desired signal transmitted over communication channel 14. It is likely that common coefficients will be sufficient for all K remote devices 18. The propagation of the undesirable signal through equalizer 202 may be a function of the remote device 18 due to the independent equalizer coefficients. In this case, independent comb ring buffers (i.e., bulk memory devices 263 of FIG. 3) may be desirable. The system depicted in FIG. 4 having two or more local comb coefficients could be used to adjust a common ring buffer to independent sets of equalizer coefficients.

Figure 5:
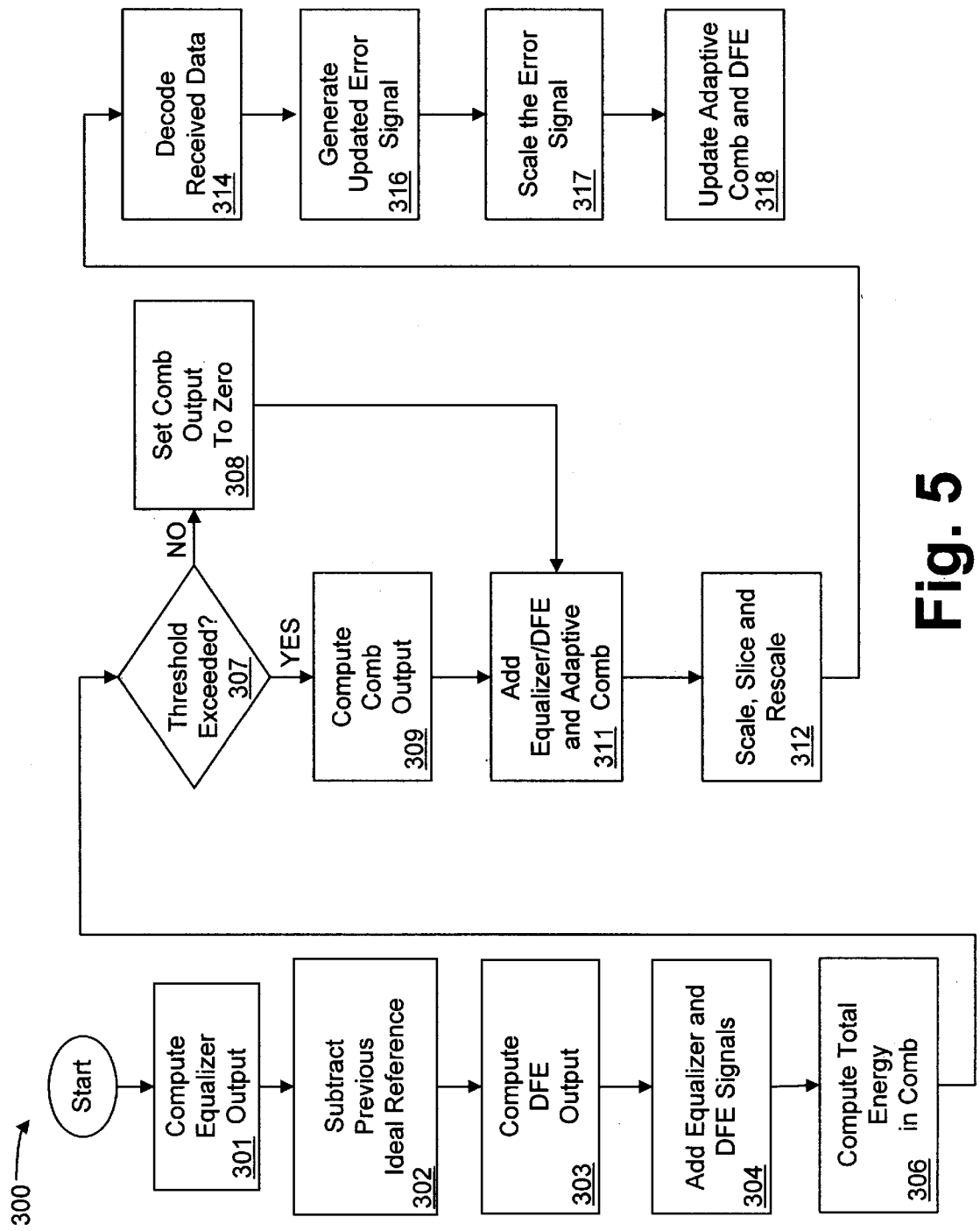
FIG. 5 is a flow chart illustrating the operation of the adaptive comb filter and decision feedback equalizer.

Referring now to FIG. 5, shown is a flow chart illustrating the operation of the present invention. First, the forward, or conventional equalizer output is computed in block 301. After training the conventional equalizer 202, DFE 231 is trained and then adaptive comb filter 232 is trained during the last $\frac{1}{60}^{th}$ second of equalizer training. This assures that one period of the undesirable signal (for example, a 60 Hz signal) will pass through DFE 231 and adaptive comb filter 232 during training. A peak error detector operates during this period and will detect the low frequency periodic impulse noise. Block 302 subtracts the previous ideal reference signal from the previous equalizer output in order to generate a new input to the adaptive comb filter and DFE. Block 303 computes the output of the DFE. Block 304 adds the equalizer output to the compensation signal output of the DFE in order to generate the DFE compensated signal. In block 306, the total energy in the comb filter is computed. Block 307 decides whether the computed value from block 306 exceeds a threshold value. If the threshold value is not exceeded, the comb filter output is set to zero in block 308. If the value computed in block 306 exceeds the threshold value, the output of the comb filter is computed in block 309. Block 311 adds the output of the comb filter to the combined equalizer and DFE output. In block 312 this fully compensated signal is scaled, sliced and rescaled in order to generate the new ideal reference signal. Block 314 performs a data decoding operation by using the slicer output to decode the received data. Block 316 subtracts the compensated signal from the ideal reference signal in order to generate an updated error signal. In block 317, the updated error signal is multiplied by Beta in order to scale it for use in updating the coefficients of the adaptive equalizer. Finally, in block 318, the error signal is correlated with data stored in the equalizer, adaptive comb filter, and DFE in order to update their coefficients using the Least Mean Squares (LMS) algorithm.

Trellis Coding

In an alternative embodiment of the present invention, DFE 231 memory can be derived from a Viterbi decoder used in systems that employ trellis coding. Trellis is a well known error detection and correction technique that employs the well known Viterbi algorithm and decoder. With each stage of delay in the Viterbi decoder, the signal estimate improves. DFE's are generally not used with trellis coding because a good signal estimate is typically unavailable for 16 or more symbol periods due to the Viterbi delay. The adaptive comb filter of the present invention can employ the delay of the Viterbi decoder to reduce the large delay of the ring buffer 263 of the adaptive comb filter. Furthermore, the ideal references derived from the Viterbi decoder can be used in the adaptive comb filter's ring buffer.

Decision Feedback Equalizer

The DEE is a complex filter with N coefficients where N=5 in the preferred embodiment. The output of the DFE is computed as the accumulated products $$xd[i]+=cx[j]*xe[i-j]-cy[j]* ye[i-j]$$

$$yd[i]+=cx[j]*ye[i-j]+cy[j]* xe[i-j]$$

where xd,yd are the DFE outputs at symbol instant i, cx,cy are the DFE's adaptive coefficients and xe,ye are the DFE inputs at symbol instant i-j. The summation is computed for j=1 to M where M is the number of DFE coefficients. The complex (2-dimension) DFE provides spectral resolution across the full symbol bandwidth of the channel. A real (1-dimension) DFE is not desirable because it forces symmetrical solutions at half the symbol rate. The coefficients are updated by the following equations $$cx[j]+=ex*xe[i-j]$$

$$cy[j]+=-ex*xe[i-j]$$

where ex,ey are the Beta scaled error vectors.

Adaptive Comb Filter

The output of the Comb filter is computed as the accumulated products $$xc[i]+=cx[j]*xe[i-j-N]-cy[j]*ye[i-j-N]$$

$$yc[j]+=cx[j]*ye[i-j-N]+cy[j]*xe[i-j-N]$$

where xc,yc are the Comb filter outputs at symbol instant i, cx,cy are the Comb filter's adaptive coefficients and xe,ye are the Comb filter inputs at symbol instant i-j-N the summation is computed for j=1 to M where M is the number of comb filter coefficients. The gating function is computed from the energy accumulation of products $$\text{Energy} +=xe[i-j-N]*xe[i-j-N]+ye[i-j-N]*ye[i-j-N]$$

The adaptive comb coefficients are computed from the LMS algorithm $$cx[j]+=ex*xe[i-j-N]$$

$$cy[j]+=-ey*xe[i-j-N]$$

where ex, ey are the Beta scaled error vectors.

The Comb filter will have a spectrum that folds or repeats at the symbol rate /N. For a symbol rate of 48,000 symbols per second where N=800 the spectrum will repeat every 60 Hz.

It is desirable to maintain the dominant comb coefficient as the center coefficient, for example coefficient 3 of 5. If the undesired signal is off frequency then the $z^{-N}$ delay will not be exactly correct. In this case the signal will eventually show up at $z^{-N-1}$ or $z^{1-N}$ With 5 or more adaptive coefficients the central coefficient will decay and one of the adjacent coefficients will grow. This can be detected and the coefficients can be shifted one symbol position to maintain the dominant coefficient at the center. When the coefficients are shifted the ring buffer pointer that picks up the $z^{-N}$ symbol can be incremented or decremented by one, effectively tracking the frequency error.

Many variations are contemplated without departing from the spirit and scope of the present invention. For example, the switch 259 selecting the comb filter input may be gated with higher precision. Even when a zero signal is expected, the output of the equalizer is valid and will contain impulses. The switch can continue to use its normal input after EOT until the local transmitter turns on, at which time it must select feedback from its own output. Then, after transmitting and selecting a new equalizer, then the normal equalizer and DFE outputs can be enabled into the comb filter to assist in detecting the SOM marker.

Therefore the following is claimed:

1. An apparatus for adaptive noise suppression in a receiver, the apparatus comprising:

a decision feedback equalizer (DFE) configured to suppress a noise signal having a period that is less than a number of tap coefficients of said DFE multiplied by a symbol period of said DFE; and an adaptive comb filter configured to suppress a periodic noise signal having a period that is greater than said number of tap coefficients of said DFE multiplied by said DFE symbol period.

2. The apparatus as defined in claim 1, wherein said adaptive comb filter further includes a ring buffer configured to store at least one of said periods of said noise signal.

3. The apparatus as defined in claim 1, wherein said adaptive comb filter further includes one adaptive coefficient.

4. The apparatus as defined in claim 3, wherein said adaptive comb filter includes additional coefficients in order to track a frequency error between said noise signal and a symbol rate of a receiver.

5. The apparatus as defined in claim 1, wherein said adaptive comb filter further includes gating apparatus configured to enable the output of said adaptive comb filter only when the energy in said adaptive comb filter exceeds a predetermined threshold.

6. The apparatus as defined in claim 1, wherein the input to said adaptive comb filter is computed based upon the combined output of said DFE and the output of an additional equalizer.

7. A method for suppressing noise in the receiver of a digital subscriber line (DSL) communication device, the method comprising the steps of:
receiving a signal in a receiver of a DSL communication device;
operating on said received signal using a decision feedback equalizer (DFE) in order to suppress a low frequency noise signal having a period that is less than a number of tap coefficients of said DFE multiplied by a symbol period of said DFE; and
operating on said received signal using an adaptive comb filter configured to suppress a periodic noise signal having a period that is greater than said number of tap coefficients of said DFE multiplied by said DFE symbol period.

8. The method as defined in claim 7, wherein said step of operating on said received signal using said adaptive comb filter further includes the step of gating said adaptive comb filter in order to enable the output of said adaptive comb filter only when the energy in said adaptive comb filter exceeds a predetermined threshold.

9. The method as defined in claim 7, further comprising the step of storing, in a ring buffer contained within said adaptive comb filter, at least one of said periods of said noise signal.

10. The method as defined in claim 7, wherein said adaptive comb filter includes one adaptive coefficient.

11. The method as defined in claim 10, wherein said adaptive comb filter includes additional coefficients in order to track a frequency error between said noise signal and a symbol rate of a receiver.

12. The method as defined in claim 7, wherein the input to said adaptive comb filter is computed based upon the combined output of said DFE and the output of an additional equalizer.

13. A method for suppressing noise in the receiver of a digital subscriber line (DSL) communication device, the method comprising the steps of:
generating a first compensation signal in a decision feedback equalizer (DFE);
adding said first compensation signal to the output of an equalizer for input to a slicer;
slicing said output of the equalizer in order to develop an ideal reference signal;
updating said DFE using an error signal generated by subtracting said ideal reference signal from the output of said equalizer;
generating a second compensation signal in an adaptive comb filter;
adding said second compensation signal to the output of said equalizer; and updating said adaptive comb filter using an error signal generated by subtracting said ideal reference signal from the output of said equalizer having said first compensation signal added thereto.

14. The method as defined in claim 13, further comprising the step of storing, in a ring buffer contained within said adaptive comb filter, at least one of said periods of said noise signal.

15. The method as defined in claim 13, wherein said adaptive comb filter includes one adaptive coefficient.

16. The method as defined in claim 15, wherein said adaptive comb filter includes additional coefficients in order to track a frequency error between said noise signal and a symbol rate of a receiver.

17. A computer readable medium having a program for suppressing noise in the receiver of a digital subscriber line (DSL) communication device, the program comprising:
logic configured to receive a signal in a receiver of a communication device;
logic configured to operate on said received signal using a decision feedback equalizer (DFE) in order to suppress a low frequency noise signal having a period that is less than a number of tap coefficients of said DFE multiplied by a symbol period of said DFE; and
logic configured to operate on said received signal using an adaptive comb filter configured to suppress a periodic noise signal having a period that is greater than said number of tap coefficients of said DFE multiplied by said DFE symbol period.

18. The program as defined in claim 17, wherein said logic configured to operate on said received signal using an adaptive comb filter further includes gating logic configured to enable the output of said adaptive comb filter only when the energy in said adaptive comb filter exceeds a predetermined threshold.

19. The program as defined in claim 17, further comprising logic configured to store, in a ring buffer contained within said adaptive comb filter, at least one of said periods of said noise signal.

20. The program as defined in claim 17, wherein said adaptive comb filter includes one adaptive coefficient.

21. The program as defined in claim 17, wherein said adaptive comb filter includes additional coefficients in order to track a frequency error between said noise signal and a symbol rate of a receiver.

22. The program as defined in claim 17, wherein the input to said adaptive comb filter is computed based upon the combined output of said DFE and the output of an additional equalizer.

23. A computer readable medium having a program for suppressing noise in the receiver of a digital subscriber line (DSL) communication device, the program comprising:
logic configured to generate a first compensation signal in a decision feedback equalizer (DFE);
logic configured to add said first compensation signal to the output of an equalizer for input to a slicer;
logic configured to slice said output of the equalizer in order to develop an ideal reference signal;
logic configured to update said DFE using an error signal generated by subtracting said ideal reference signal from the output of said equalizer;
logic configured to generate a second compensation signal in an adaptive comb filter;
logic configured to add said second compensation signal to the output of said equalizer; and
logic configured to update said adaptive comb filter using an error signal generated by subtracting said ideal reference signal from the output of said equalizer having said first compensation signal added thereto.

24. The program as defined in claim 23, further comprising logic configured to store, in a ring buffer contained within said adaptive comb filter, at least one of said periods of said noise signal.

25. The program as defined in claim 23, wherein said adaptive comb filter includes one adaptive coefficient.

26. The program as defined in claim 25, wherein said adaptive comb filter includes additional coefficients in order to track a frequency error between said noise signal and a symbol rate of a receiver.

27. An apparatus for adaptive noise suppression in a receiver, the apparatus comprising:
an adaptive comb filter including a gating apparatus configured to enable the output of said adaptive comb filter only when the energy in said adaptive comb filter exceeds a predetermined threshold; and
a decision feedback equalizer (DFE) configured to suppress a noise signal having a period that is less than a number of tap coefficients of said DFE multiplied by a symbol period of said DFE.

28. The apparatus as defined in claim 27, wherein for a number M of tap coefficients of said adaptive comb filter, a period between $N/f_s$ and $(N+M)/f_s$ is canceled, where N is a number of symbol delays in a memory, and $f_s$ is a symbol rate of said receiver.

29. The apparatus as defined in claim 27, wherein said adaptive comb filter further includes a ring buffer configured to store at least one period of said noise signal.

30. The apparatus as defined in claim 27, wherein said adaptive comb filter further includes at least one adaptive coefficient.

31. An apparatus for adaptive noise suppression in a receiver, the apparatus comprising:
an adaptive comb filter; and
a decision feedback equalizer (DFE) configured to suppress a noise signal having a period that is less than a number of tap coefficients of said DFE multiplied by a symbol period of said DFE, wherein the input to said adaptive comb filter is computed based upon the combined output of said DFE and the output of an additional equalizer.

32. The apparatus as defined in claim 31, wherein for a number M of tap coefficients of said adaptive comb filter, a period between $N/f_s$ and $(N+M)/f_s$ is canceled, where N is a number of symbol delays in a memory, and $f_s$ is a symbol rate of said receiver.

33. The apparatus as defined in claim 31, wherein said adaptive comb filter further includes a ring buffer configured to store at least one period of said noise signal.

34. The apparatus as defined in claim 31, wherein said adaptive comb filter further includes at least one adaptive coefficient.

35. A method for suppressing noise in the receiver of a digital subscriber line (DSL) communication device, the method comprising the steps of:
receiving a signal in a receiver of a DSL communication device, said receiver including an adaptive comb filter;
gating said adaptive comb filter in order to enable the output of said adaptive comb filter only when the energy in said adaptive comb filter exceeds a predetermined threshold; and
operating on said received signal using a decision feedback equalizer (DFE) in order to suppress a low frequency noise signal having a period that is less than a number of tap coefficients of said DFE multiplied by a symbol period of said DFE.

36. The method as defined in claim 35, wherein for a number M of tap coefficients of said adaptive comb filter, a period between $N/f_s$ and $(N+M)/f_s$ is canceled, where N is a number of symbol delays in a memory, and $f_s$ is a symbol rate of said receiver.

37 The method as defined in claim 35, further comprising the step of storing at least one period of said noise signal in a ring buffer.

38. The method as defined in claim 31, wherein said adaptive comb filter further includes at least one adaptive coefficient.

39. A method for suppressing noise in the receiver of a digital subscriber line (DSL) communication device, the method comprising the steps of:
receiving a signal in a receiver of a DSL communication device, said receiver including an adaptive comb filter; and
operating on said received signal using a decision feedback equalizer (DFE) in order to suppress a low frequency noise signal having a period that is less than a number of tap coefficients of said DEE multiplied by a symbol period of said DFE, wherein the input to said adaptive comb filter is computed based upon the combined output of said DFE and the output of an additional equalizer.

40. The method as defined in claim 39, wherein for a number M of tap coefficients of said adaptive comb filter, a period between $N/f_s$ and $(N+M)/f_s$ is canceled, where N is a number of symbol delays in a memory, and $f_s$ is a symbol rate of said receiver.

41. The method as defined in claim 39, further comprising the step of storing at least one period of said noise signal in a ring buffer.

42. The method as defined in claim 39, wherein said adaptive comb filter further includes at least one adaptive coefficient.

43. A computer readable medium having a program for suppressing noise in the receiver of a digital subscriber line (DSL) communication device, the program comprising:
logic configured to receive a signal in a receiver of a communication device, said logic including an adaptive comb filter;
gating logic configured to gate said adaptive comb filter in order to enable the output of said adaptive comb filter only when the energy in said adaptive comb filter exceeds a predetermined threshold; and
logic configured to operate on said received signal using a decision feedback equalizer (DFE) in order to suppress a low frequency noise signal having a period that is less than a number of tap coefficients of said DFE multiplied by a symbol period of said DFE.

44. The program as defined in claim 43, wherein for a number M of tap coefficients of said adaptive comb filter, a period between $N/f_s$ and $(N+M)/f_s$ is canceled, where N is a number of symbol delays in a memory, and $f_s$ is a symbol rate of said receiver.

45. The program as defined in claim 43, further comprising logic configured to store at least one period of said noise signal in a ring buffer.

46. The program as defined in claim 43, wherein said adaptive comb filter further includes at least one adaptive coefficient.

47. A computer readable medium having a program for suppressing noise in the receiver of a digital subscriber line (DSL) communication device, the program comprising:

logic configured to receive a signal in a receiver of a communication device, said logic including an adaptive comb filter; and logic configured to operate on said received signal using a decision feedback equalizer (DFE) in order to suppress a low frequency noise signal having a period that is less than a number of tap coefficients of said DFE multiplied by a symbol period of said DFE, wherein the input to said adaptive comb filter is computed based upon the combined output of said DFE and the output of an additional equalizer.

48. The program as defined in claim 47, wherein for a number M of tap coefficients of said adaptive comb filter, said period between $N/f_s$ and $(N+M)/f_s$ is canceled, where N is the number of symbol delays in a memory, and $f_s$ is a symbol rate of said receiver.

49. The program as defined in claim 47, fitter comprising logic configured to store at least one of said periods of said noise signal in a ring buffer.

50. The program as defined in claim 47, wherein said adaptive comb filter further includes at least one adaptive coefficient.

* * * * *

UNITED STATES PATENT AND TRADEMARK OFFICE
CERTIFICATE OF CORRECTION

PATENT NO. : 6,011,814
DATED : January 4, 2000
INVENTOR(S) : Martinez e al.

It is certified that error appears in the above-identified patent and that said Letters Patent is hereby corrected as shown below:

Column 9, line 53, delete "DEE" and substitute therefor --DFE--.
Column 10, line 2, delete "cy[j]+=-ex*xe[i-j]" and substitute therefor --cy[j]+=-ey*xe[i-j]--.
Column 10, line 10, delete "yc[j]" and substitute therefor --yc[i]--.
Column 14, line 23, delete "DEE" and substitute therefor --DFE--.

Signed and Sealed this

Second Day of January, 2001

Attest:

Attesting Officer

Q. TODD DICKINSON
Commissioner of Patents and Trademarks